United States Patent Office

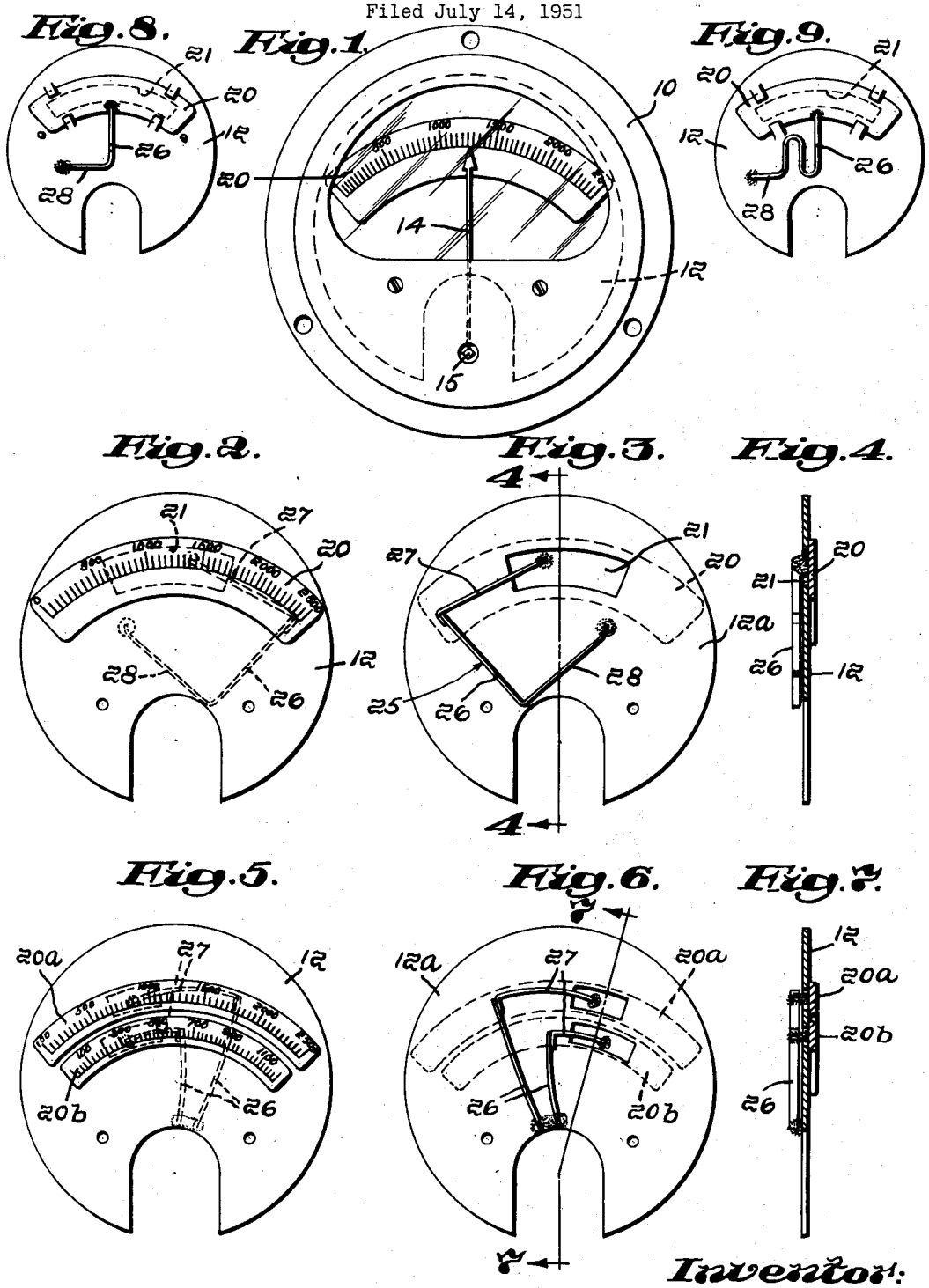

2,716,343
Patented Aug. 30, 1955

2,716,343

TEMPERATURE INDICATING METER

Emil S. Wieszeck, Salem, N. H.

Application July 14, 1951, Serial No. 236,727

3 Claims. (Cl. 73—361)

This invention relates to a temperature indicating meter of the millivolt-meter or micro-milli-ammeter type, and more particularly to a pyrometer adapted for use with a thermocouple, or multiple thermocouples in series, or parallel, or for pyrometers used with radiation thermocouple units where a lens in such a radiation unit focusses infrared rays onto the hot junction of its thermocouple or thermocouples.

The principal object of the invention is to provide a compensating mechanism to correct for temperature changes at the cold junction or end of a thermocouple in a temperature measuring instrument associated with the thermocouple.

As is well known, variations in the temperature at the cold end of a thermocouple cause variations in the voltage and the electrical current induced therein by the temperature at the hot end. As an illustration, if the temperature at the hot end of the chromelalumel thermocouple is 1500° F., and the cold end is 75° F., the voltage normally produced by this thermocouple is 21.30 millivolts. However, with the same temperature at the hot end, should the room temperature and hence that at the cold end of the thermocouple drop to 50° F. the thermocouple will normally produce 21.80 millivolts, and thus indicate a difference in temperature of 25° F. on the dial. If it were possible to have the pyrometer indicate the room temperature, the pointer would stand at 50 on the dial, instead of 75, and the additional millivoltage would be correctly absorbed by the pyrometer.

For accurate temperature measurement, therefore, it is necessary to compensate for the variations in room temperature, at the cold end of the thermocouple. Ordinarily, this is done on the pointer or needle. A bi-metallic spiral is attached to one of the hair-springs of the moving coil with its attached pointer or needle. Hence, as the bi-metallic spiral expands and contracts according to temperature variations in the room, the hair-spring is moved and the pointer responds by moving up or down scale proportionately. Such a compensated meter, built to high accuracies, is relatively expensive, and requires redesigning of the ordinary uncompensated meter movement to incorporate such a bi-metallic spiral. Other attempted methods of compensating a pyrometer of the indicating type, with moving coil, have failed because of high cost, and introduction of undesirable meter characteristics, such as fragility and susceptibility to ordinary factory vibration.

I have sought to provide an inexpensive compensating mechanism, most simply applicable to common types of uncompensated moving coil type meters, by adjustably moving the scale, instead of the pointer. For this purpose, I provide a movable segment scale which is moved by a specially shaped, simple bi-metallic element, according to temperature variations at the cold end. As a result, I am able to supply a practical and accurate compensated pyrometer at lowest cost, and am able to equip many existing, non-compensating pyrometers with my inexpensive compensator without altering the meter mechanism.

Briefly, my invention comprises a temperature measuring instrument which includes a pyrometer and a thermocouple having the usual hot junction and cold junction. The hot junction, of course, is arranged at the source of heat, or absence of heat, the temperature of which is to be measured, and the cold junction is arranged within the casing of the pyrometer, or adjacent to it. The pyrometer includes an indicating needle or pointer, which is movable in response to changes in voltage from the thermocouple which are proportional to temperature. I further provide a movable segmental scale associated with the needle, but mechanically independent of it and the meter mechanism. One end of my compensator is usually fixed to the underside of the scale pan, while the segmental scale is usually fixed to the free end of the bi-metallic compensating element. Since an ordinary, straight bi-metal strip will curl with temperature change, it is obvious that the distance between its extremities will vary with the degree of temperature change and subsequent curling. Hence, were the scale segment carried by such a simple strip, its distance from the moving coil and needle axis would vary constantly, with the scale losing its symmetry with the needle. Further, the curling action of such a simple strip would tip the scale segment off its predetermined arc.

To overcome the shortening effect of the simple, bi-metallic strip, I have in one instance bent its fixed end at approximately right angles and call this bent section the foot. The extremity of this foot is then fixed to the scale pan. As the bi-metal curls, the foot also curls a predetermined amount, bringing the free end of the compensator to a predetermined scale arc continuously. This corrective action applies when the vertical portion of the compensator is straight at one extremity of the compensating range, such as at 32° F. of the 32-150° F. compensating range. Arbitrarily, I chose to make the vertical section straight at 32° F. the lowest anticipated room temperature the meter might be used in. Then, as temperature increases, the vertical section or straight section continuously shortens itself, while the foot continuously raises the vertical section. A second foot, reversed in orientation to the vertical section and attached to the free end, has the segmental scale attached to the extremity of the free end of this foot. The reversed strip then continuously corrects scale tipping, and perfect alignment of the moving scale is maintained throughout the compensating range selected.

If desired, or necessary, two or more separate compensated scales may be provided on the pyrometer, a feature possible only with my compensator.

In some instances, the right angle foot of my compensator usually fixed to the scale pan, may be omitted, and the action of the reversed strip at right angles to the free end is sufficient to provide the total necessary corrective action for the shortening of the vertical strip as well as for the tipping of the scale.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation and it is not intended to limit the invention claimed herein beyond the requirements of the prior art.

Further advantages and details of my invention will be found in the following specification and accompanying drawings in which:

Fig. 1 is a front elevation of a pyrometer embodying my compensating mechanism;

Fig. 2 is a front elevation of a dial face showing the compensating mechanism for the scale in dotted lines;

Fig. 3 is a rear view of the dial face shown in Fig. 2;

Fig. 4 is a vertical section on line 4—4 of Fig. 3;

Fig. 5 is a front elevation of a dial face showing a multi-scale form of my device;

Fig. 6 is a rear view of the face shown in Fig. 5;

Fig. 7 is a section on line 7—7 of Fig. 6;

Fig. 8 is a rear elevation of a third form of my compensating mechanism; and

Fig. 9 is a rear elevation of a fourth form of my compensating mechanism.

In the drawings, 10 represents the casing of a standard industrial pyrometer, which is included in combination with a standard form of thermocouple (not shown). As is well known, a thermocouple is any two dissimilar metals welded together at one end, generally in wire form. An iron wire welded to a copper nickel alloy wire, known as "Constantan" is one form of thermocouple. When the welded tip, or hot junction of the thermocouple is heated, a measurable voltage results at the cold junction or end of the thermocouple. This voltage for practical purposes is almost directly proportional to the difference in temperature between the heated, welded tip or the hot junction, and the temperature at the cold end. As explained above, the variations in the room temperature or at the cold end of the thermocouple will cause variations in the voltage and the electrical current induced therein by the temperature at the hot end, an illustration of which is given above.

I have accordingly sought to compensate for the variations in the voltage and electrical current caused by the variations in the cold end of the thermocouple. To do this I have made the scale adjustably movable.

The pyrometer casing 10 has supported therein a dial 12 mounted at the front of the casing on a dial plate or pan 12a, the latter member being carried in the casing in any convenient manner. An indicating arm or needle 14 is pivoted at 15 in the bottom of the casing and the pivoted portion extends through the dial 12, as suggested in Fig. 1.

In accordance with the invention I provide in conjunction with this casing and dial arrangement a movable segment scale 20 having the usual temperature scale divisions and arc enclosure appearing thereon. Formed through the dial 12 and dial plate 12a is an arcuate slot 21 through which is received a special scale support for the scale segment 20.

This special scale support comprises a bimetallic element generally indicated by the arrow 25 and which support, in the form shown in Figs. 2 to 4, inclusive, includes portions extending angularly with respect to one another and consisting of a straight leg portion 26, a free end or foot portion 27 generally reversed in orientation to the rest of the bimetallic structure and occurring at approximately right angles to the straight leg portion 26, and, finally, a second foot portion 28. The free end 27 of the bimetallic element carries the segmental scale rigidly attached thereto. The second foot portion 28 is preferably formed integral with the straight leg 26 and at its extremity is fixedly attached, as by soldering or otherwise, to the rear surface of the dial plate 12a. In this position there is no possible source of friction between the scale support and adjacent surfaces of the dial plate or dial member.

As is well known, the bi-metallic element 25 is comprised of two metals welded together having two different coefficients of expansion. The bi-metallic element is naturally adjusted in size, length, and materials suitable for the particular application, and it will be understood that the straight leg 26, for instance, will curl or bow to the left as shown in Fig. 3, the degree of curling or bowing depending upon the room temperature, and as an illustration, the range of temperature may be designed from 32° F. through 150° F. In the form of the device shown in Figs. 2 to 4, with the two feet 27 and 28 at the ends of the straight leg 26, the foot 27 has its bi-metallic characteristic reversed with respect to the leg portion 26, so that while the straight leg 26 curls or bows out to the left, the foot portion 27 curls or bows upwardly, correcting for the tipping action of the straight leg 26 while curling along its whole length. The lower foot, with its extremity fixed to the scale backing pan also dips upward as the vertical portion curls or bows toward the left, transmitting the proper arcuate motion to the scale segment 20. With this compensation for the variations in room temperature by movement of the scale segment 20, the indication of the needle 14 with respect to the scale 20 will be accurate, and will eliminate the considerable inaccuracy due to variations in the room temperature or temperature at the cold end of the thermocouple.

In Figs. 5 to 7, I have shown a modified form of my compensator, in which the bi-metallic element 25 includes the straight leg portion 26 and only one foot 27 on the leg. The operation of the second form is entirely like the first, except that the second foot 28 is omitted. This is permissible on shorter scale lengths, or compressed calibration, since foot 27 will correct for both scale tipping and changes in distance between the extremities of the vertical leg simultaneously. In Figs. 5, 6 and 7 I have also shown a double scale model with separate segmental scales 20a and 20b covering different ranges of temperature.

Another form of my compensator shown in Fig. 8, eliminates the reversed, top foot 27. This foot is omitted when the scale segment is not fixed to the bi-metallic compensator as in above illustrations, but carried by smooth bearings, and the free end of straight leg 26 engages a slot or suitable catch to move the scale with temperature changes. It will be noted that the foot 28 causes the free end of the straight leg 26 to follow a perfect arc, and correctly engage the movable scale.

Another form of my compensator shown in Fig. 9 consists of the straight leg 26 with foot 28, but with a section of bi-metal similar in shape to the electrical sine-wave interposed between leg 26 and foot 28. The free end of leg 26 engages a catch or slot on the movable segmental scale 20. The sine-wave portion of the bimetals expands and contracts with changes of temperature in accordion fashion, introducing a greater lateral motion to the free end of the straight leg 26. This arrangement permits greater compensating range coverage than would ordinarily be possible with the devices described above.

A variation of the sine-wave type compensator is a sawtooth arrangement of bi-metals interposed between leg 26 and foot 28. The extremities of the bi-metals comprising the saw-tooth section are soldered or otherwise fixed. Where space limitations might exist for mounting the sine-wave type compensator, the saw-tooth type would be used.

Two more forms of my compensator result by adding foot 27 to the free extremity of leg 26 as represented in the sine-wave form and saw-tooth form of my compensator. In the description of the sine-wave and saw tooth form the free end of leg 26 would drive a suspended segmental scale. In the present forms herein a segmental scale would be carried by foot 27, as by soldering.

My compensating mechanism may also be designed to compensate for errors due to the use of copper in the pyrometer. As is well known, copper changes its electrical resistance in accordance with variations in temperature, and this introduces another error, since all meters are normally calibrated at a room temperature of about 70° F. The variations in resistance due to the use of a copper metal are similarly compensated by designing the bi-metallic element 25 to take care of such necessary adjustment. It is also to be noted, that my form of compensation cannot upset the meter calibration as might the standard compensation that winds or unwinds one of the hair-springs of the meter movement, thereby constantly changing the characteristics of the meter.

I claim:

1. A temperature measuring instrument for use in a pyrometer of the class having a thermocouple, said instrument including a casing, a dial mounted therein, said dial having an arcuate slot therein, an arcuate segment with scale indicia thereon movable in said slot, an indicating arm mounted on a pivoting shaft extending through said dial and rotatable in response to a pyrometer member to cooperate with said indicia, a bimetallic element comprising a foot portion comprised of two metal elements of different coefficients of expansion secured at one end to said arcuate segment, a leg portion secured at substantially a right angle to the other end of said foot portion, said leg portion comprising two metal elements of different coefficients of expansion, and a second bimetallic foot portion comprising two bimetallic elements of different coefficients of expansion secured at one end at approximately a right angle to the end of the leg portion and at the other end to the said casing, the said portion lying in a plane substantially parallel to the dial face, the bimetallic elements of the leg portion being secured together in an arrangement opposite to that of the foot portions so that the said leg portion tends to deflect in one direction and the foot portions tend to deflect in the opposite direction.

2. The invention as defined in claim 1 in which the arcuate center of the arcuate portion is coincident with the pivot of the said indicating arm.

3. The article according to claim 1 including a second bimetallic element and a second scale member attached thereto.

References Cited in the file of this patent

UNITED STATES PATENTS

| 1,363,964 | Frey et al. | Dec. 28, 1920 |
| 1,952,626 | Johnson | Mar. 27, 1934 |
| 2,514,745 | Dalzell | July 11, 1950 |

FOREIGN PATENTS

| 654,515 | France | Nov. 29, 1928 |
| 397,269 | Great Britain | Aug. 24, 1933 |